United States Patent [19]

Herzig

[11] 4,101,499
[45] Jul. 18, 1978

[54] POLYORGANOSILOXANES CONTAINING HOMOGENEOUSLY DISTRIBUTED FILLERS

[75] Inventor: Joachim Herzig, Leichlingen, Germany

[73] Assignee: Bayer Aktiengesellschaft, Leverkusen, Germany

[21] Appl. No.: 709,978

[22] Filed: Jul. 30, 1976

[30] Foreign Application Priority Data

Aug. 7, 1975 [DE] Fed. Rep. of Germany ....... 2535334

[51] Int. Cl.² .............................................. C08L 83/04
[52] U.S. Cl. ............................ 260/37 SB; 260/29.2 M
[58] Field of Search .................................... 260/37 SB

[56] References Cited

U.S. PATENT DOCUMENTS

| | | | |
|---|---|---|---|
| 3,243,404 | 3/1966 | Martellock | 260/37 SB |
| 3,624,023 | 11/1971 | Hartlage | 260/37 SB |
| 3,642,685 | 2/1972 | Matherly | 260/37 SB |
| 3,734,882 | 5/1973 | Talcott | 260/37 SB |
| 3,817,910 | 6/1974 | Viksne | 260/37 SB |
| 3,929,718 | 12/1975 | Kratel et al. | 260/37 SB |

*Primary Examiner*—Lewis T. Jacobs
*Attorney, Agent, or Firm*—Burgess, Dinklage & Sprung

[57] ABSTRACT

A viscosity-stable composition comprising by weight a. about 20 to 100 parts of a linear polyorganosiloxane of the formula

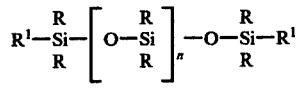

in which R is an optionally substituted hydrocarbon radical with up to 10 C atoms, R¹ has any of the definitions of R and in addition can be an OH radical, and n is a positive integer, b. about 5 to 50 parts of a highly disperse active filler with a surface area of at least 50 m²/g, c. about 1 to 5 parts of a modifying agent of the formula

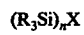

in which R is as defined above, X is halogen, OH, OR, S, OOCR, N or NY, Y is hydrogen or any of the definitions of R, and n is 1, 2 or 3, and d. about 0.1 to 10 parts of water (based on (a) + (b) + (c)), is produced by treating the filler with the modifying agent, in the presence of water, during its incorporation into the polyorganosiloxane. The preferred filler is silica but may also comprise $TiO_2$, $Al_2O_3$, $Fe_2O_3$ and/or ZnO. Other additives may also be included.

11 Claims, No Drawings

POLYORGANOSILOXANES CONTAINING HOMOGENEOUSLY DISTRIBUTED FILLERS

The present invention relates to a process for the homogeneous distribution of highly disperse active fillers with a BET surface area of at least 50 m²/g in polyorganosiloxanes.

Highly disperse active fillers with a BET surface area of at least 50 m²/g have long been used as a constituent in mixtures in combination with polyorganosiloxanes. Fields of application are, for example, silicone rubbers which can be vulcanized at room temperature or elevated temperature, silicone greases for electrical insulations, silicone anti-foaming agents or silicone lacquers. Although fillers based on silica make up the main constituent of the highly disperse fillers employed, substances such as $TiO_2$, $Al_2O_3$, ZnO or $Fe_2O_3$, for example, are also additionally used.

A difficulty experienced when preparing mixtures of polyorganosiloxanes containing highly disperse active fillers, is in achieving a uniform distribution of the fillers in the mixture and a further difficulty lies in the fact that when the mixtures are stored for a prolonged period their consistency changes in an undesirable manner, this change resulting, depending on the initial consistency, in an increase in the viscosity, a decrease in the fluidity, the appearance of thixotropic phenomena, stiffening-up, an increase in the penetrometer value and the like (compare, for example, W. Noll, Chemie und Technologie der Silicone (Chemistry and Technology of Silicones), Verlag Chemie, Weinheim, 1968, page 346).

The difficulties described are due to the chemical nature of the highly disperse fillers and of the polyorganosiloxane as well as the physical surface properties of the high disperse fillers.

In the form in which they are supplied, commercially available highly disperse active fillers are already to a certain extent in an agglomerated form and the forces between the individual filler particles within the agglomerates can be so great that the agglomerates are not destroyed even by a process of incorporation, in which high shear forces arise, and this results in inhomogeneous distribution of the highly disperse active filler in the mixture. Uniform distribution of the filler is also made more difficult by the low chemical affinity of the filler for the polyorganosiloxanes. Under certain circumstances, the interaction of the individual filler particles with one another is greater than the interaction between the filler and the polyorganosiloxane and this hinders uniform wetting and distribution. Some effects of the interactions between the filler and the polyorganosiloxanes become evident only in the course of time, after preparation of the mixture, and this has the result that the consistency of the mixtures changes in an undesirable manner when they are stored.

Various processes have already been proposed in order to ensure as uniform as possible a distribution of the filler. The process most frequently employed is the use of so-called dispersing substances, which are added to the mixture during the process of incorporating the filler into the polyorganosiloxane. Substances used as dispersing agents are those which increase the affinity of the surface of the filler for the polyorganosiloxane, and thus render the surface more easily wettable by the polyorganosiloxane. Dispersing substances are compounds which, due to their chemical structure, have an affinity both for the filler and for the polyorganosiloxane. Dispersing substances which are known and have been described are, for example, diphenylsilanediol, short-chain silanols or siloxanols or also short-chain siloxanes which contain alkoxy groups. None of the substances used hitherto provide a distribution which is as uniform as is necessary for practical requirements and in many cases it is necessary to subject the mixture containing the filler to an additional process step immediately after the mixing process, in order to remove filler which is not uniformly distributed. The additional process step can be, for example, a sieving process, a rolling process or a strainer process. The modification of the filler surface by the dispersing substance is slight and when the resulting mixtures are subjected to prolonged storage their consistency changes considerably and for many practical applications the mixtures must be subjected to a replasticizing step before final processing.

A further method used in order to achieve as uniform as possible a distribution of highly disperse fillers in polyorganosiloxanes consists in suitably modifying the surface of the highly disperse filler itself, during or after the preparation thereof, so that the filler can be incorporated without using dispersing substances. The treatment of the filler for the purposes of modification is preferably carried out with reactive organosilicon compounds, if appropriate with the aid of a catalyst which accelerates the modification process. Substances which are suitable as modifying agents and which have already been described as such are octamethylcyclotetrasiloxane, hexamethylcyclotrisiloxane, silazanes, alkoxysilanes or short-chain polyorganosiloxanes containing OH groups, on their own or in the presence of catalysts, such as ammonia, ammonium compounds, amines, heavy metal compounds or acids. The modification process can be carried out in the gaseous phase, in a solvent or in aqueous solution. However, all the known processes are subject to the disadvantage that the highly disperse filler has to be subjected before use to an involved process in which considerable volumes have to be handled.

The incorporation, into polyorganosiloxanes, of fillers which have been modified on the surface in a suitable manner can then be carried out without dispersing substances and leads, in respect of the distribution of the filler in the mixture and the change in consistency during storage, to the same results as when a filler which has not been surface-treated but which is combined with dispersing substances is used.

An object of the present invention is to provide a process for the preparation of mixtures comprising polyorganosiloxanes and highly disperse active fillers with a BET surface area of at least 50 m²/g, in which no dispersing substances in the abovementioned sense and no filler which is surface-modified before incorporation are required and with which it is possible to achieve uniform distribution of the filler, the mixtures being stable on storage, without undergoing stiffening-up.

The subject of the present invention is a process for the homogeneous distribution, in polyorganosiloxanes, of highly disperse active fillers with a specific surface area (according to BET) of at least 50 m²/g, which is suitable for the preparation of mixtures of fillers and polyorganosiloxanes, which are stable on storage and do not change in consistency over a prolonged period, characterized in that the filler is treated, during the process of incorporation, in the presence of water with a modifying agent of the general formula $(R_3Si)_nX$ in which
R is an optionally substituted hydrocarbon radical with up to 10 C atoms,
X is halogen, OH, OR, S, OOCR, N or NY,
Y is a hydrogen or any of the definitions of R, and
n is 1, 2 or 3.

The mixtures suitable for the process according to the invention contain the following individual constituents:

a. about 20 to 100, preferably about 50 – 80, parts by weight of a linear polyorganosiloxane of the general formula

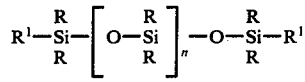

in which
R is as defined above,
$R^1$ has any of the definitions of R and in addition can be an OH radical, and
n is a positive integer.

b. about 5 to 50, preferably about 10 – 40, parts by weight of a highly disperse active filler with a BET surface area of at least 50 m²/g.

c. 0 to about 200, preferably about 5 to 100, parts by weight of additional substances, such as, for example, additional fillers, plasticizers, solvents, flameproofing agents or pigments of an inorganic or organic nature.

The abovementioned constituent (a) is a linear polyorganosiloxane, the molecule chain of which is saturated with monovalent hydrocarbon radicals R. R can be a substituted or unsubstituted, saturated or aliphatically unsaturated hydrocarbon radical and is preferably selected from alkyl radicals, such as, for example, methyl, ethyl, propyl, butyl, hexyl or i-propyl, aryl, or aryl radicals, such as, for example, phenyl, diphenyl or naphthyl, or alkaryl radicals, such as, for example, tolyl, xylyl or ethylphenyl, or aralkyl radicals, such as, for example, benzyl or phenylethyl, or halogen-substituted alkyl or aryl radicals, such as, for example, chloromethyl, 3,3,3-trifluoropropyl, chlorophenyl, tetrachlorophenyl or difluorophenyl, and alkenyl radicals, such as, for example, vinyl or allyl. In addition, R can also represent cyanoalkyl, cycloalkyl and cycloalkenyl radicals.

$R^1$ has the same meaning as R but can additionally also represent an OH group.

Different radicals R and $R^1$ can be present in a molecule of constituent (a).

The value of the number n is decisive for the viscosity of the linear polyorganosiloxane and is so selected that the viscosity of the linear polyorganosiloxane is between about 10 cP and $8 \times 10^6$ cP at 25° C. Constituent (a) can also consist of mixtures of polymers in which the value of the number n is different.

Component (b) is a commercially available highly disperse active filler with a BET surface area of at least 50 m²/g, preferably at least about 100 m²/g. Substances which can be used are those such as $TiO_2$, $Al_2O_3$, $Fe_2O_3$, ZnO or, preferably, silica obtained by pyrogenic means or by wet precipitation. The preparation process and the chemical nature of the filler are of no significance for the process according to the invention. It is important merely that the filler used is a filler which has a BET surface area of the indicated order of magnitude.

A further essential point is that it is not necessary to employ a filler which has been modified during or after its preparation, but that it is possible to use commercially available fillers. Examples of suitable fillers which may be mentioned are silica obtained by pyrogenic means or wet precipitation, such silicas being marketed under the tradenames Aerosil ® by Degussa, Cabosil ® by Cabot, and HDK ® by Wacker-Chemie, aluminum oxide or titanium dioxide obtained by pyrogenic means and marketed under the name Aluminum Oxide O ® and, respectively, Titanium Dioxide P 25 ® by Degussa, or Active Zinc Oxide ® marketed by Bayer AG.

Constituent (c) can additionally be added to the mixture of constituent (a) and constituent (b) and can be, for example, an additional filler or a plasticizer, solvent, pigment, flameproofing agent or odorous substance. The fillers can be surface-treated fillers or untreated fillers of different chemical nature and particle size. Examples of the many possible fillers which may be mentioned are: titanium dioxide, lithopone, zinc oxide, zirconium silicate, diatomaceous earths, calcium carbonate, calcium sulfate, barium sulfate, crushed quartz, gravelly soil, silicon dioxide obtained by pyrogenic means or by wet precipitation, surface-modified silicon dioxide, magnesium oxide, glass fibers, asbestos, chromium oxide and iron oxide. In addition, further additives, such as organic solvents and plasticizers or frameproofing agents, such as, for example, carbon black, antimony trioxide and chlorinated paraffins, and odorous substances, can also be added to the mixture of constituent (a) and constituent (b).

In addition, the mixtures can also contain resinous compounds which have $SiO_2$ and/or $SiO_{3/2}$ units.

According to the invention, the highly disperse active filler is incorporated by suitably modifying the surface of the filler, in the presence of constituent (a), during the process of incorporation. For this purpose it is necessary that the modifying agent is added to constituent (a) before the filler is added. The modifying agent is a substance which is able to modify the surface of the filler in the desired manner without an additional catalyst being present but which does not enter into a chemical reaction with constituent (a) under the reaction conditions selected. It was found that compounds of the general formula $(R_3Si)_nX$ are suitable for modifying fillers according to the present invention in the desired manner, in the presence of constituent (a). In the above formula R has the meaning indicated for constituent (a), n is a positive number and can have a value of 1, 2 or 3 and X is a radical of the formula H, OH, OR, halogen, S, OOCR, N or NY (in which R has the meaning indicated under (a) and Y is a monovalent hydrocarbon radical or hydrogen). Examples which may be mentioned are: hexamethyldisilazane, trimethylsilane, trimethylchlorosilane, trimethylethoxysilane, tri-organosilylmercaptans, triorganosilyl acylates or tri-organosilylamines.

Compounds in which the radical R is a methyl radical and the radical X represents the group NY, in which Y is preferably a hydrogen atom, are particularly preferred according to the invention.

According to the invention, the modifying agent is added in an amount of about 1 – 50, preferably about 3

— 20, parts by weight, to the mixture consisting of (a) and (b) and (c).

According to the invention it is necessary that between about 0.1 and 10 parts by weight, preferably between about 2 and 6 parts by weight of water are added to the mixture of constituent a) and the modifying agent before the highly disperse active filler is added. The reaction between the modifying agent and the highly disperse filler is promoted by the presence of water. In addition, the water assists in accelerating uniform distribution of the filler in the presence of the modifying agent.

The highly disperse active filler is incorporated at room temperature or at only slightly elevated temperature. The incorporation is not critical and no special precautionary measures need to be taken into account. It is appropriate to add the highly disperse active filler to the mixture of constituent (a), the modifying agent and water not all at once but batchwise, so that the amount of highly disperse active filler added at a particular time is wetted and incorporated within a short period. The distribution of the highly disperse active filler in the mixture of constituent (a), the modifying agent and water can be effected with commercially available equipment suitable for this purpose, preferably with so-called Z-blade kneaders or planetary stirrers.

The amount of the highly disperse active filler to be incorporated depends on the desired consistency of the mixture and, in the case of mixtures in which constituent (a) contains radicals R or R', which are available for a vulcanization reaction, at room temperature or elevated temperature, with appropriate crosslinking substances, on the required mechanical properties of the vulcanized products.

After the highly disperse active filler has been completely incorporated, the mixture consisting of component (a), the modifying agent, water and the filler is preferably so subjected to brief mechanical stress (for example excess pressure, pressure between rollers or kneading stress) that the mixture remains in the tightly closed mixing apparatus for about 10 minutes to 2 hours. After mechanical stressing of the mixture is ended, excess modifying agent and water are removed either by applying vacuum or by opening the mixing unit at elevated temperature and venting it until excess modifying agent and water have volatilized virtually completely. Preferably, the temperature is increased and vacuum is applied at the same time.

Component (c) can be added to the resulting mixture in the desired amount in order to influence the consistency and, in the case of mixtures which can be vulcanized, the mechanical properties of the vulcanized products. The mixtures according to the present invention have many diverse uses, examples which may be mentioned being: silicone rubbers in which the radical $R^1$ is an OH group and which can be converted at room temperature, by means of suitable crosslinking substances into the rubber-elastic state; silicone rubbers in which some of the radicals $R^1$ are olefinically unsaturated groups, for example the vinyl group, and which can be converted, at room temperature or elevated temperature, under the influence of catalysts and with the aid of compounds containing Si-H groups into the rubber-elastic state; and silicone rubbers which contain up to about 5 mole % of olefinically unsaturated groups and which can be converted with the aid of sources of free radicals, such as, for example, peroxides or UV light, into the rubber-elastic state. Mixtures of polyorganosiloxanes, in which $R^1$ is a saturated aliphatic group, with highly disperse active fillers are used as a basis for mixtures of crosslinking agents which are stable on storage, such as are used for crosslinking two-component silicone rubbers which vulcanize at room temperature, and mixtures of this type are also employed as so-called silicone greases for electrical insulations or as anti-foaming agents for liquids. The mixtures according to the invention are suitable as substances which prevent fillers from settling out.

In the following text the invention is illustrated in more detail by examples. All the parts quoted in the examples are parts by weight. All the viscosities were determined at 25° C and the surface areas were determined by the BET method (ASTM Special Technical Bulletin No. 51, 1941, page 95).

EXAMPLE 1

900 g of a polydimethylsiloxane stopped by trimethylsiloxy end groups and having a viscosity of 10,000 cP at 25° C were initially introduced, together with 50 g of hexamethyldisilazane and 40 g of water, into a Z kneader, these constituents were mixed and 100 g of a silica obtained by pyrogenic means and having a BET surface area of 200 g/m$^2$ were then slowly kneaded in until a homogeneous mixture was obtained. The mixture was then warmed to 130° C and kneaded for 1.5 hours in the closed Z kneader and excess hexamethyldisilazane and water were then stripped off in vacuo over a period of 1 hour and the mixture was then cooled to room temperature. A free-flowing homogeneous mixture with a viscosity of 36,000 cP at 25° C was obtained. After storing for 8 weeks, the consistency of the mixture had not changed and it had a viscosity of 41,500 cP at 25° C.

EXAMPLE 2

The procedure described in Example 1 was repeated, but 200 g of a highly disperse silica obtained by pyrogenic means and having a BET surface area of 200 g/m$^2$ were added to 800 g of a polydimethylsiloxane stopped by trimethylsiloxy end groups and having a viscosity of 10,000 cP, with hexamethyldisilazane and water in the same amounts as in Example 1. A homogeneous slow-flowing mixture with a viscosity of 87,000 cP at 25° C was obtained. After storing for 8 weeks, the consistency of the mixture had not changed and it had a viscosity of 99,000 cP at 25° C.

EXAMPLE 3 (COMPARISON EXAMPLE)

Example 1 was repeated without the addition of hexamethyldisilazane and water. A mixture was obtained which was not capable of flow and tended to form lumps and which in the course of storing for 8 weeks showed considerable stiffening-up. A viscosity measurement was not possible because of the consistency of the mixture.

EXAMPLE 4

520 g of a polydimethylsiloxane stopped by OH end groups and having a viscosity of 18,000 cP, 50 g of hexamethyldisilazane, 40 g of water and 225 g of a silica obtained by pyrogenic means and having a BET surface area of 200 m$^2$/g were mixed according to the procedure indicated in Example 1.

The resulting mixture was free-flowing and had a viscosity of 530,000 cP at 25° C. On storing for 8 weeks, the mixture retained its flow and after this period had a viscosity of 720,000 cP.

EXAMPLE 5

250 g of a polydimethylsiloxane stopped by trimethylsiloxy end groups and having a viscosity of 20 cP were additionally added to the mixture according to Example 4, after this had been prepared, and uniformly kneaded in. A mixture which flowed readily and had a viscosity of 116,000 cP at 25° C was obtained. On storage for 8 weeks, the mixture remained free-flowing and had a viscosity of 163,000 cP.

EXAMPLE 6

20 g of a polydimethylsiloxane stopped by OH end groups and having a viscosity of 40 cP at 25° C were additionally added to the mixture according to Example 5. The resulting mixture was free-flowing and had a viscosity of 92,000 cP. On storage for 8 weeks, the mixture retained its flow and had a viscosity of 103,000 cP.

EXAMPLE 7

According to the procedure indicated in Example 1, 700 g of a polydimethylsiloxane stopped by OH end groups and having a viscosity of 5,000 cP at 25° C were mixed with 50 g of hexamethyldisilazane and 40 g of water, and 30 g of a silica obtained by pyrogenic means and having a BET surface area of 130 m$^2$/g were then incorporated. A free-flowing mixture with a viscosity of 158,000 cP was obtained. After 8 weeks the mixture had retained its flow and had a viscosity of 197,000 cP.

EXAMPLE 8

According to Example 1, 50 g of hexamethyldisilazane and 40 g of water were added to 850 g of a polydimethylsiloxane stopped by vinyl end groups and having a viscosity of 10,000 cP and 150 g of a silica obtained by pyrogenic means and having a surface area of 200 m$^2$/g were then added.

This gave a mixture of poor flow with a viscosity of 320,000 cP, which when stored for a period of 8 weeks retained its flow and had a viscosity of 410,000 cP.

EXAMPLE 9

According to Example 1, 700 g of a polydimethylsiloxane stopped by vinyl end groups and having a viscosity of 10,000 cP were mixed with 200 g of a silica obtained by pyrogenic means and having a BET surface area of 200 m$^2$/g, and 100 g of a polydimethylsiloxane stopped by trimethylsiloxy end groups and having a viscosity of 10 cP were additionally added to the prepared mixture. A free-flowing mixture which was stable on storage and had a viscosity of 152,000 cP was obtained.

EXAMPLE 10

50 g of hexamethyldisilazane, 40 g of water and 150 g of a silica obtained by pyrogenic means and having a BET surface area of 200 m$^2$/g were added to 850 g of a polydimethylsiloxane stopped by vinyl end groups and having a viscosity of 5 × 10$^6$ cP and the mixture was processed according to Example 1. This gave a plastic, kneadable, soft composition which showed no noticeable stiffening-up after storage for 8 weeks.

EXAMPLE 11

Example 1 was repeated using, in place of silica, an aluminum oxide obtained by pyrogenic means and having a BET surface area of 100 m$^2$/g. The resulting mixture had the same consistency and storage stability as indicated in Example 1 and had a viscosity of 25,000 cP.

EXAMPLE 12

Example 1 was repeated using, in place of silica, a titanium dioxide obtained by pyrogenic means and having a BET surface area of 50 m$^2$g. The resulting mixture had the same consistency and storage stability as indicated in Example 1 and had a viscosity of 21,700 cP.

It will be appreciated that the instant specification and examples are set forth by way of illustration and not limitation, and that various modifications and changes may be made without departing from the spirit and scope of the present invention.

What is claimed is:

1. A process for the preparation of a storage-stable homogeneously filled polyorganosiloxane comprising forming a mixture of polyorganosiloxane, water and a modifying agent of the formula $$(R_3Si)_nX$$

in which
R is an optionally substituted hydrocarbon radical with up to 10 C atoms,
X is a halogen, OH, OR, N, S, OOCR or NY,
Y is hydrogen or any of the definitions of R, and
n is 1, 2 or 3,
adding thereto silica having a specific surface area of at least 50m$^2$/g, and subsequently cold curing the filled polyorganosiloxane.

2. The process according to claim 1, wherein the modifying agent comprises hexamethyldisilazane.

3. The process according to claim 1, wherein the mixture of silica and modifying agent is subjected to mechanical stress.

4. The process according to claim 1, wherein about 0.1 to 10 parts by weight of water are added per 20 to 100 parts by weight of polyorganosiloxane.

5. The process according to claim 1, wherein the silica has a surface area of at least about 100 m$^2$/g and is added in about 5 to 50 parts by weight per 20 to 100 parts by weight of polyorganosiloxane.

6. The process according to claim 1, wherein R is alkyl of up to 6 carbon atoms, phenyl, diphenyl, tolyl, xylyl, ethylphenyl, benzyl, phenylethyl, vinyl, allyl, cycloalkyl or cycloalkenyl, or a halogen or cyano-substitution product thereof.

7. The process according to claim 6, wherein the silica is added in about 10 to 100 parts by weight per 50 to 200 parts by weight of polyorganosiloxane, the modifying agent is added in about 1 to 50 parts by weight, about 2 to 6 parts of water are added, about 5 to 100 parts by weight of an additional filler, plasticizer, solvent, flame-proofing agent or pigment are added, and the mixture is subjected to mechanical stress.

8. A viscosity-stable composition comprising by weight
a. about 20 to 100 parts of a linear polyorganosiloxane of the formula

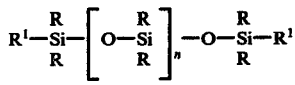

in which
R is an optionally substituted hydrocarbon radical with up to 10 C atoms,
$R^1$ has any of the definitions of R and in addition can be an OH radical, and
n is a positive integer,
b. about 5 to 50 parts of silica with a surface area of at least 50 m²/g,
c. about 1 to 5 parts of a modifying agent of the formula

in which
R is as defined above,
X is halogen, OH, OR, S, OOCR, N or NY,
Y is hydrogen or any of the definitions of R, and
n is 1, 2 or 3, and
d. about 0.1 to 10 parts of water (based on (a) + (b)).

9. A composition according to claim 8, comprising by weight
a. about 50 to 100 parts of the polyorganosiloxane wherein
R is alkyl of up to 6 carbon atoms, phenyl, diphenyl, tolyl, xylyl, ethylphenyl, benzyl, phenylethyl, vinyl, allyl, cycloalkyl or cycloalkenyl, or a halogen or cyano-substitution product thereof.
b. about 10 to 50 parts of silica having a surface area of at least about 100 m²/g,
c. about 3 to 5 parts of the modifying agent, and
d. about 2 to 6 parts of water.

10. A composition according to claim 9, further including about 5 to 100 parts by weight of an additional filler, plasticizer, solvent, flameproofing agent or pigment.

11. The product produced by the process of claim 7.

* * * * *